United States Patent [19]

Busch

[11] Patent Number: 4,800,512

[45] Date of Patent: Jan. 24, 1989

[54] METHOD AND APPARATUS FOR DETERMINING AND DETECTING DATA INDICATIVE OF THE CONDITION OF MACHINES THROUGH A UNIQUE DATA PROBE INCLUDING A TEST DATA PROBE PORTION AND AN IDENTIFYING DATA SENSING PROBE PORTION

[75] Inventor: Dieter Busch, Ismaning, Fed. Rep. of Germany

[73] Assignee: Pruftechnik Dieter Busch & Partner GmbH & Co., Ismaning, Fed. Rep. of Germany

[21] Appl. No.: 878,366

[22] Filed: Jun. 25, 1986

[30] Foreign Application Priority Data

Jun. 28, 1985 [DE] Fed. Rep. of Germany ....... 3523289

[51] Int. Cl.[4] ..................... G01H 11/00; G06F 15/46; G01D 5/34
[52] U.S. Cl. .................................. 364/551.01; 73/660; 73/661; 235/376; 235/449; 235/451; 235/462; 324/179; 250/231 SE
[58] Field of Search .................. 364/550, 551; 57/414; 73/660, 661, 593; 235/375, 376, 462, 449, 451; 324/73 R, 73 AT, 166, 173, 174, 175, 179, 208; 250/231 SE, 227

[56] References Cited

U.S. PATENT DOCUMENTS

| 3,162,804 | 12/1964 | Parsons | 324/208 |
|---|---|---|---|
| 3,771,362 | 11/1973 | Roberts | 324/175 |
| 3,831,008 | 8/1974 | Bradshaw | 235/451 |
| 3,848,112 | 11/1974 | Weichselbaum et al. | 235/375 |
| 3,900,814 | 8/1975 | Masuda | 324/208 |
| 4,000,465 | 12/1976 | Sugiyama | 324/166 |
| 4,018,083 | 4/1977 | Hoffman | 73/660 |
| 4,031,466 | 6/1977 | Krause et al. | 324/166 |
| 4,056,850 | 11/1977 | Brown | 364/200 |
| 4,121,574 | 10/1978 | Lester | 364/557 |
| 4,196,390 | 4/1980 | Pitkin | 324/173 |
| 4,283,679 | 8/1981 | Ito et al. | 324/174 |
| 4,345,146 | 8/1982 | Story et al. | 235/451 |
| 4,392,375 | 7/1983 | Eguchi et al. | 324/208 |
| 4,471,444 | 9/1984 | Yee et al. | 364/551 X |
| 4,480,471 | 11/1984 | Kögler et al. | 73/462 |
| 4,520,674 | 6/1985 | Canada et al. | 364/508 |
| 4,529,933 | 7/1985 | Bleeke | 324/173 |
| 4,530,240 | 7/1985 | Board et al. | 73/593 |
| 4,612,620 | 9/1986 | Davis et al. | 364/551 |
| 4,615,216 | 10/1986 | Vykoupil | 73/593 |
| 4,642,459 | 2/1987 | Caswell et al. | 250/227 |
| 4,669,315 | 6/1987 | Sato et al. | 73/660 |
| 4,683,542 | 7/1987 | Taniguti | 73/660 X |

FOREIGN PATENT DOCUMENTS

| 0124434 | 11/1984 | European Pat. Off. . |
| 0128123 | 12/1984 | European Pat. Off. . |
| 2941123 | 4/1980 | Fed. Rep. of Germany . |
| 3214575 | 10/1983 | Fed. Rep. of Germany . |
| 2018069 | 10/1979 | United Kingdom . |

Primary Examiner—P. S. Lall
Assistant Examiner—Joseph L. Dixon
Attorney, Agent, or Firm—Bernard, Rothwell & Brown

[57] ABSTRACT

A measuring instrument for determining and evaluating data representative of the condition of a machine provided with measuring points is provided with a test data probe, incorporating a test data receiver and an evaluation circuit with memory for picking up and evaluating the test data received from the relevant measuring points, and with an identifying data sensing probe incorporating a sensing unit for sensing identifying data at the measuring points. The memory includes storage positions for data specific to the measuring points which are activated by the corresponding identifying data from the measuring points. The test data probe and the identifying data sensing probe are provided in a common housing. Within the common housing there is a measuring chamber which is open towards the forward end of the measuring head of the instrument, the chamber accommodating a machine-side data transfer component which is also the carrier for the identifying data specific to the measuring points. The identifying data sensing unit is arranged at the side of the measuring chamber, seen in the direction of placement of the measuring instrument, and is movable along the identifying data of the identifying data carrier.

21 Claims, 7 Drawing Sheets

METHOD AND APPARATUS FOR DETERMINING AND DETECTING DATA INDICATIVE OF THE CONDITION OF MACHINES THROUGH A UNIQUE DATA PROBE INCLUDING A TEST DATA PROBE PORTION AND AN IDENTIFYING DATA SENSING PROBE PORTION

CROSS-REFERENCE TO OTHER APPLICATION

Cross-reference is made to co-pending application Ser. No. 839,577, filed Mar. 14, 1986.

FIELD OF THE INVENTION

This invention relates to a method of determing and evaluating data representative of the condition or state of machines provided with measuring points, and is also concerned with apparatus for carrying out such methods.

In the method and apparatus a test data probe is applied at the measuring points and the test data thereby measured is transferred to an evaluation circuit which incorporates memory means and is there processed. In a further measuring step, by means of an identifying data sensing probe, an identifying value or values provided at each respective measuring point are sensed and the sensed identifying data is transmitted to the memory means of the evaluation circuit in order to adapt the evaluation circuit to that particular measuring point of the machine.

In rotary engines or power units or sets, such as for example in the case of pumps, generators, fans, turbosets, compressors and the like, study of the running behavior is carried out at more or less regular intervals, with a view to detecting possible changes. These changes can lead for example to oscillations or pulsations and can be due to intermittent or shock pulses or wave emission conditions of the bearing (unbalanced), and as a result of temperature changes in the machine housing and in the bearings. Monitoring of the running behavior of such rotary machines is of great importance both for the safety and maintenance of such machines, as well as to ensure that their life is not shortened.

DESCRIPTION OF THE PRIOR ART

Generally, measurements on such machines are carried out manually. As a rule, the measuring operations are carried out on these machines manually by appropriate maintenance personnel, with the aid of testing and measuring instruments. The determined test data which is obtained from a measuring point is transferred to an appropriately pre-printed form. For an oscillation measurement it is necessary for example, in the case of an appropriate machine combination, to carry out a measuring sequence of twelve measurements. Thus, it is necessary for example to carry out three measurements in the X-axis direction, in the Y-axis direction and in the Z-axis direction, on the driving side and at the output side of a motor as well as on the driving side and at the output side of a pump connected to the motor. Each measured result must be indicated. Also, in addition to this, it is necessary, while on site itself, to carry out an evaluation of the results of the measurements, in order for example to be able to evaluate sudden and unexpected changes at any particular measuring point, in case corrective measures need to be taken rapidly. This assumes however that the maintenance personnel are suitably qualified persons to be able to evaluate such changes at the measuring points correctly. In order to determine whether there is damage to bearings, a shock pulse measuring instrument is known, by means of which damage to the bearings of machines provided with rotary machine sets can be determined. Such bearing damage is associated with the most frequent cause of machine breakdown. Consequential damage, operational breakdowns and production losses lead to additional cost factors which are no negligible and which cannot be disregarded. These known shock pulse measuring instruments pick up mechanical shock waves which arise as short-term pressure waves in rolling bearings. Such pressure waves are evaluated appropriately. An increased shock pulse value indicates a bearing fault. However, the fault indication can be the result of a false construction, deficient lubrication or some other defect which would all be signalled by the increased shock pulse value. Before carrying out a measurement at a measuring point the shaft diameter to be investigated, as well as the speed of rotation, must be set on an instrument scale. This desired value, entered by hand, serves as a reference level. If then the reference level is exceeded by the measured real value, then this can be signalled for example by an optical indication or alternatively by an acoustic signal.

One such acoustic shock pulse probe has been developed further in another known analysing instrument. This known analysing probe measuring instrument likewise reacts to shock pulses originating from bearings. The known instrument comprises a microprocessor and an indicator. With the help of the analysing instrument, the degree of lubrication as well as the thickness of an oil film between the loaded bearing surfaces can be ascertained for example and indicated digitally in the form of binary code numbers. The two binary code numbers represent the condition code and the lubrication factor. In order that the microprocessor can make an evaluation and comparison measurement, a plurality of empirically determined data values are previously entered into a store and are retrieved as reference values. Before the carrying out of a measurement, the operator or maintenance person for the machine must enter into the measuring instrument binary code numbers representative of the size, the type, and the speed of rotation of the bearing to be measured. For the entry of this bearing-specific data of a machine, it is necessary that the operator knows this data; he then finally enters it by way of a suitable keyboard. For this, the operator needs appropriate formulas and prepared lists for these specific measuring point data.

Such a method of entry of information before carrying out the actual measurement is time-consuming and means that there is the danger that unintentional false data for the measuring point will be inserted, with the consequence that a false comparison result of real value against desired value is obtained. As a rule, such measurement regulations contain a predetermined sequence of the measuring points to be examined. In order for the work to be carried out rationally, it is therefore necessary for the operator, in carrying out the sequence of measurements, to keep to this series as established by the regulations. Any departure from this sequence means an additional expenditure of time and increases the error quota with respect to the entry of the characteristic data. For this reason it is disadvantageous that the operator, for each measuring point, must first create the correlation with the desired value. It is also disadvantageous that, besides the measuring instrument, a working or installation plan must be used.

In the older European patent application No. 85103023.9 (and corresponding U.S. patent application Ser. No. 839,577, filed Mar. 14, 1986), in order to eliminate the disadvantages arising from the known method and apparatus, a method as well as an associated apparatus of the general type first referred to above have been proposed.

According to this latter proposed method, the sensing of the identifying data takes place in a first reading operation, while the sensing of the test data is carried out in a separate sensing operation.

SUMMARY OF THE INVENTION

It is an object of the present invention to provide a method, as well as apparatus for carrying out the method, of the type first referred to above and by means of which it should be possible for the operator, without difficulty, to be able to test the measuring points automatically in respect of their characteristics without having to pay attention to an identification data carrier.

This object is achieved in accordance with the present invention in that the sensing of the identifying data and the sensing of the test data can be carried out during or after a single placement movement of the measuring unit consisting of the test data probe and the identifying data probe.

From this there arises the advantage that in the stroke of a single placement movement of the measuring unit both the sensing of the identifying data and also the sensing of the test data is carried out automatically, so that data packets which consist of the identifying data and the test data are produced automatically. The user of the measuring instrument therefore no longer needs to pay special attention to possible identifying data carriers. It is nevertheless still possible that identifying data carriers can be provided in the region of the measuring points, although, particularly with numerous measuring points, the operator no longer needs to check accurately whether he has or has not sensed an identifying data carrier, or whether the sensing of an identifying data carrier has been forgotten.

This uncertainty is avoided by the method of the present invention, as well as by the apparatus of the present invention.

According to a preferred feature of the invention, by means of the identifying data sensing probe, optical or capacitive or magnetic or inductive or mechanical characteristics at the measuring points can be sensed automatically.

Furthermore, the processing of the test data and of the identifying data from the measurement steps can be carried out in a portable measuring instrument. It is however also possible that the processing can be carried out in a central data processing installation, in which case then a further processing and retrieval of the test data and identifying data is necessary in the central processing apparatus, especially in the central data processing installation.

The measuring instrument for carrying out the method of determining the condition of a machine provided with a plurality of measuring points comprises a test data probe which comprises a test data receiver and an evaluation circuit with memory means for picking up and evaluating test data received from the respective measuring points, and an indentifying data sensing probe comprising a sensor unit for sensing identifying data representative of the measuring points, wherein the memory means comprises storage space for data specific to the measuring points and which is activated by the corresponding identifying data from the measuring points, wherein the test data probe and the identifying data sensing probe are provided in a common housing in which there is provided a measuring chamber for a machine-side data transfer means, said chamber being open towards the forward end of the measuring head, said data transfer means also being a carrier for the identifying data specific to the measuring points, and wherein the identifying data sensing probe is arranged at the side of the measuring chamber, viewed in the direction of placement of the measuring instrument, and is movable along the identifying data of the identifying data carrier.

From this there is the advantage that because of the relative movement between the identifying data sensing unit and the identifying data of the identifying data carrier, the identifying data which characterizes the individual measuring points is delivered automatically. In connection with this it is advantageous that a measuring chamber which is open towards the forward end of the measuring head is provided, which contains both the test data receiver and also the identifying data sensing unit, so that upon placing or setting the measuring head of the measuring instrument on the data transfer means of the machine, a reading off of the test data and of the identifying data is possible automatically. The construction of the measuring head with measuring chamber permits a single placement movement to suffice both for producing the identifying data and also for the transmission of the test data.

In a preferred embodiment, the test data receiver is arranged at the bottom of the measuring chamber, and the identifying data sensing unit is fixedly arranged at the lateral measuring head end of the measuring chamber so that it is moved along the identifying data when the measuring head is placed on the data transfer means.

According to another embodiment, the identifying data sensing unit is mounted movably in the measuring chamber and is movable along the identifying data by a drive means when the measuring head has been placed or set on the data transfer means. From this there arises the advantage that a sensing of the identifying data is possible at constant sensing speed, since the sensing probe is moved along the identifying data by motor means operating at constant speed.

According to a further embodiment, the head end of the measuring head is provided with fastening means which fix or secure the measuring head to the data transfer means when the measuring head is placed on the data transfer means.

The fastening means preferably comprises resilient, latch-type lever means which automatically grip a retaining means on the data transfer means when the measuring head is set in place.

Preferably, the identifying data sensing probe is formed as a digitally-operating optical probe with a radiation source, a radiation-sensitive receiver and a digital signal processing circuit for reading and evaluating optical indentifying data.

According to another possibility, the identifying data sensing probe may be formed as a capacitive probe for reading capacitive identifying data.

According to a further possibility, the identifying data sensing probe may be formed as a magnetic reading head for the reading of magnetic identifying data.

According to yet a further alternative, the identifying data sensing probe may be formed as an induction reading head for the reading of inductive identifying data.

Alternatively, it is possible that the identifying data sensing probe may be formed as a sensor having a pulse generating circuit for the sensing of mechanical or electrical codings.

Preferably, the test data receiver is mounted resiliently in the measuring chamber for sprung movement in the direction of placement of the measuring head. From this there arises the advantage that not only is it possible to achieve a secure fixing of the measuring instrument to the data transfer means, but in addition to this one creates a snug, pressure-loaded contact between the test data receiver and the test data transmitter.

According to a preferred embodiment, an operating switch is provided, by means of which, with the measuring head in place, both the test data probe and the identifying data probe can be switched into effective operation.

Also, it is possible that the operating switch may be formed as a pressure switch or telescopic switch and that it is actuated by telescopic-type relative displacement of two parts of the housing of the measuring instrument.

According to a further preferred embodiment, the test data probe comprises an acoustic signal receiver, particularly a shock signal receiver, as well as an analog to digital converter.

The detected identifying data and test data are first dealt with in a microcomputer with memory means in a portable measuring instrument which is provided with connecting means through which the identifying data and test data can be transmitted to a central data processing installation.

The identifying data carrier for carrying out the method of the present invention is a constituent part of an adaptor which is provided with a measuring receiver portion by means of which it can be fitted into a hole at the measuring point and which, moreover, is provided at the other end with a signal generating part for the test data. Moreover, the identifying data carrier of the adaptor may be formed as an optical or capacitive or inductive or magnetic or mechanical carrier for digital measuring point identifying data in the form of bar-coded or block-coded markings or in the form of capacitive identifications or in the form of inductive identifications or in the form of magnetic identifications or in the form of pulse identifications. It is also within the scope of the present invention that the identifying data carrier may be formed as magnetic memory means or as readable fixed-value memory means.

With the help of the automatic identifying data reading, in combination with the automatic test data reading, there follows the adaptation and setting of the evaluation circuit to the respective measuring point. This means that, for example, the instrument number as well as the data values characteristic of the measuring points are read off and are activated in the memory of the decentralised and/or central evaluation circuit.

The subsequent measurement of the test data of the measuring points then represents the actual value measurements which follow on from the desired value settings. With the help of this automatic identification sensing at each measuring point, there results the further advantage that the time necessary for the measurement and determination of the measured values for each measuring point is considerably reduced, with simultaneous reduction in the error quota in the relationship as between the measured values and the identifying data. Operator-generated faults are therefore automatically excluded. Because of the automatic reading of the identifying data, no false inputs or transmission errors due to operator error will arise.

A further advantage is that the technical qualifications of the operator can therefore be considerably reduced. The association of the individual measured values from the measuring points on a machine or on different machines with the individual measuring points and machines is accomplished within the shortest possible time, since with the aid of the identifying data probe the test data arising from the measuring points is produced in suitably prepared digital form, especially as machine-readable signals, sent in sequence to the evaluation circuit. Consequently, the aforesaid data can be transferred to a central data processing installation and can be retrieved from there. Each new measurement then updates the stored data.

For the sensing of the measuring point identifying data, the microprocessor of the microcomputer is brought into action, for the recall of desired value data for the measuring points stored in the writing and reading memory. These are brought to the display in an advantageous manner to provide an indication for the operator. In this manner the operator has a display of the data which is important for the particular measuring point. Upon subsequent recall of the real value measured data by activation of the test data probe, the control of the microprocessor by the test data program takes place on the basis of the actuation of the operating switch. The automatic changeover from the identifying data reading operation to the test data reading and evaluation operation means for the microprocessor a great improvement in reliability and operating speed. The test data from the measuring points recalled in the test data program cycle is processed, together with the desired value data for the measuring points, and then the operator sees this in the display. The final delivery of the data preferably takes place in the central data processing installation, in which the total data is printed out. Thus, in an advantageous manner, the operational life of the machine can be maintained on the basis of this data.

BRIEF DESCRIPTION OF THE DRAWINGS

In order that the invention may be more fully understood, a number of embodiments in accordance with the invention will now be described by way of example and with reference to the drawings. In the drawings.

DESCRIPTION OF THE PREFERRED EMBODIMENTS

Figure 1:
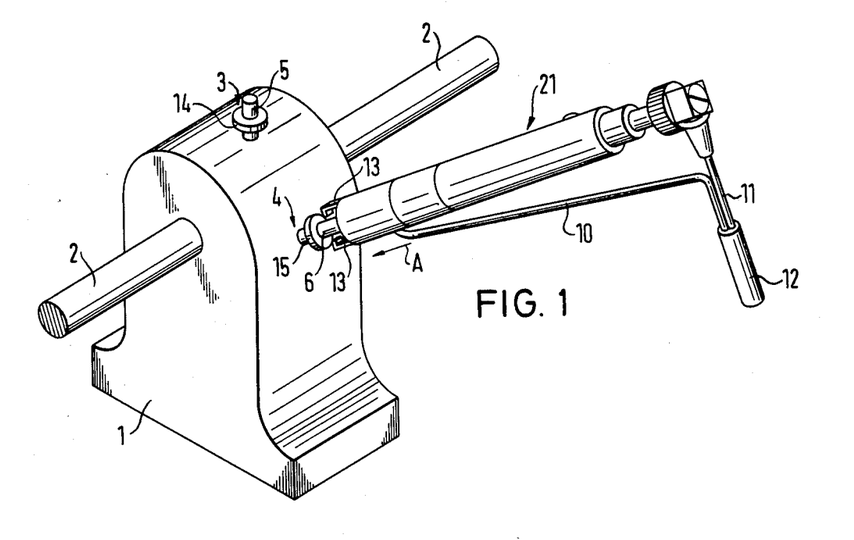
FIG. 1 is a perspective view of a machine component fitted with a measuring instrument in accordance with the invention.

Referring first to FIG. 1, a machine to be examined is indicated at 1. This machine comprises a bearing for a shaft 2. The bearing associated with the shaft 2 is located within the housing in a manner which is not illustrated. Two measuring points 3 and 4 are provided on the housing. Associated data transfer components are indicated at 5 and 6, these being screwed into bores at the associated measuring points 3 and 4.

At 21 there is indicated a measuring instrument which serves both for the reading of identifying data at the measuring points 3 and 4 and also for the sensing of test data at the respective measuring points 3 and 4. At 10 there is indicated a signal control lead for the identifying data, while at 11 there is indicated a further lead which serves for the transmission of test data. In a manner which is not shown the test data is determined with the aid of an acoustic signal receiver. The two leads 10 and 11 are fed onwards in a common lead 12. The measuring instrument includes gripper-type elements at the forward end of the measuring head, which, with the measuring instrument placed in position on the respective data transfer components 5 and 6, grip around a collar 14 and 15 respectively which is provided on the data transfer component. In this way a reproducible and therefore reliable transmission of test data and identifying data is ensured.

Figure 2:
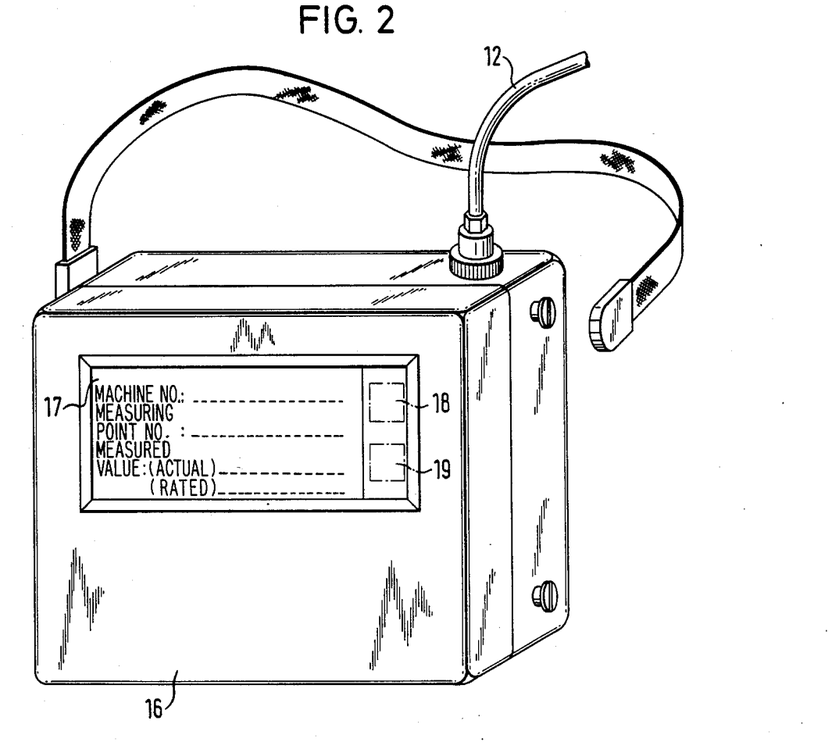
FIG. 2 shows a portable measuring instrument with an indicator panel.

As shown in FIG. 2, the common lead 12 extends to a measuring instrument 16 which is provided with an indicator panel 17. The indicator panel 17 comprises a liquid crystal display, in a manner not specifically shown, and is divided into a machine display, into a measuring point display and into a measured value display. The machine display indicates to the operator the instrument to be tested. The measuring point display reproduces the measuring point number on the instrument under test. The measured value display reproduces on the one hand the desired value and on the other hand the actual value at the particular measuring point. Two partial indicator displays 18 and 19 serve as YES/NO indicators of the measuring operation. The operator is shown in the relevant display area whether the measurement is in order or not.

Figure 3:
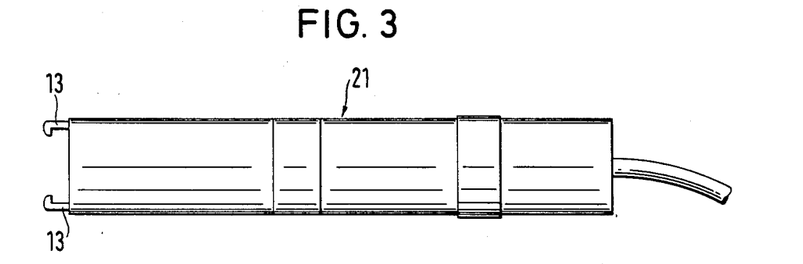
FIG. 3 shows a measuring probe for the sensing of identifying data and test data.
Figure 4:
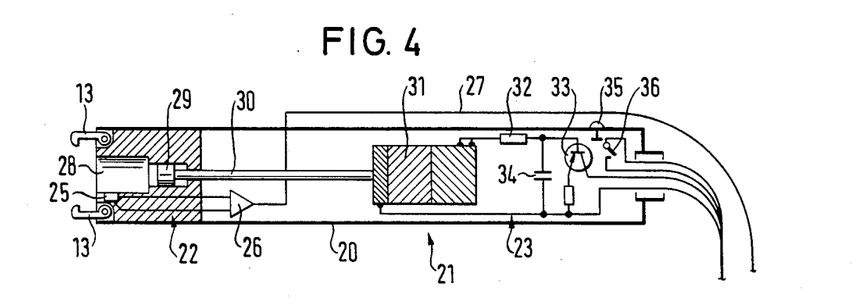
FIG. 4 is a sectional view taken through the measuring probe shown in FIG. 3.

Referring now to FIGS. 3 and 4, there is there shown, within the measuring instrument 21, both an identifying data probe 22 and also a test data probe 23. The common measuring instrument housing is indicated at 20. The identifying data probe comprises an identifying data sensing unit 25 and an amplifier 26. The associated data transfer lead is indicated at 27. At the measuring head end of the measuring instrument there is provided a measuring chamber 28 which is open in the forward end. At 29 is indicated a test data receiver which is connected by means of a stem 30 to an acoustic pulsating signal receiving element 31. Two leads are connected to the acoustic pulsating signal receiving element 31. One of these leads is connected by way of a resistance 32 to the base of a transistor 33. A capacitor is indicated at 34. The collector of the transistor 33, as well as the second connecting lead to the acoustic pulsating signal receiving element 31, is taken to the cable 11.

At 35 is indicated a push button or sensing element by means of which a switch 36 can be actuated. This switch 36 serves to switch the measuring instrument from the reading mode to the test data determining mode.

Figure 5:
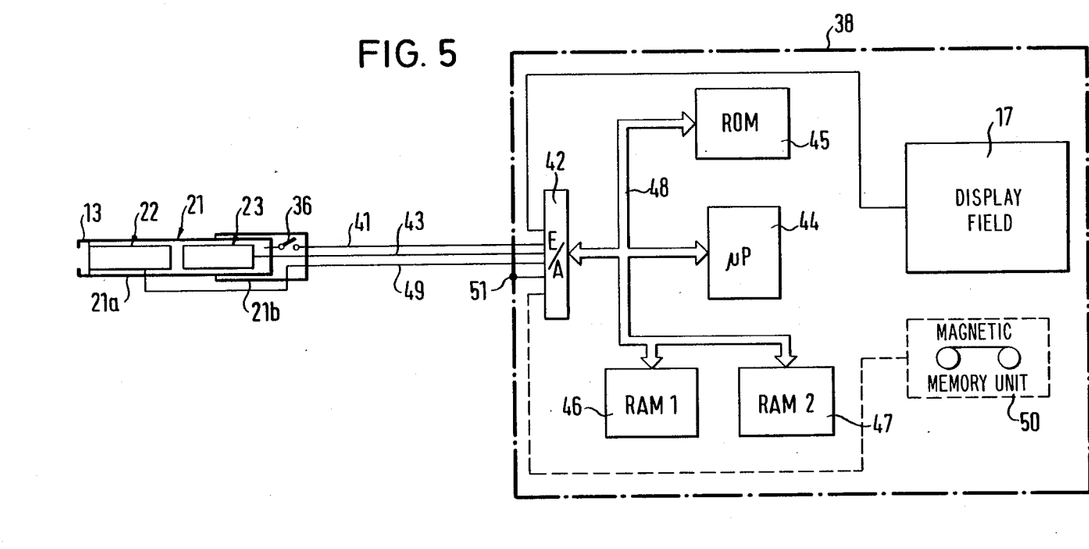
FIG. 5 is a schematic representation of an evaluation circuit to be connected to the probe.

As shown in FIG. 5, the one-piece measuring instrument 21 is connected to an evaluation circuit 38 which is embodied in the measuring instrument 16 shown in FIG. 2. In FIG. 5 the elements which correspond to the elements shown in FIG. 4 are provided with the same reference numerals. The housing 21 of the measuring instrument is formed in two parts and consists of a first, cylindrical forward housing part 21a as well as a rear housing part 21b which overlaps the front housing part 21a. The mode switch indicated at 36 is actuated when the measuring instrument 21 is pressed against the respective data transfer component 5 or 6 at the measuring point 3 or 4, whereupon the two housing parts are displaced telescopically one into the other by a predetermined amount. In this telescopic-type displacement phase the said mode switch is actuated automatically.

According to an alternative possibility, the mode switch can be actuated automatically when the grippers 13 engage the respective collar of the data transfer component, or alternatively when a sensing pin is displaced by the collar 14 or 15.

The evaluation circuit contains a microprocessor 44, a fixed value store (ROM) 45 for the supply of program running data, a first writing and reading store (RAM 1) 46, and a second writing and reading store (RAM 2) 47. The named circuit stages are connected to each other by a connecting data bus 48. Writing and reading store 46 is associated with the identifying data reading and evaluating operation, while writing and reading store 47 is associated with the data from the test value detection at the measuring points. In the fixed value store 45 is stored the program data both for the reading operation and also for the measured value detection and evaluation operation. An input/output unit 42 is connected to the indicator panel 14.

The input/output unit 42 is additionally connectable to a unit 50 which embodies a magnetic storage device. At 51 is indicated a terminal through which the stored data can be fed to a central data processing unit (not shown) for further processing, from which it is always available for recall.

Figure 6:
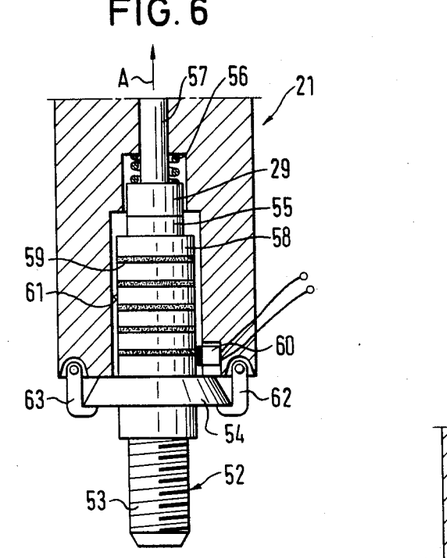
FIG. 6 is a cross-sectional view through a data transfer component with set-on measuring head fitted with a fixedly positioned sensing feeler.

FIG. 6 shows a data transfer component 52 which at its free end is provided with a screw-thread 53 and which is designed to be screwed into a corresponding bore at the measuring point 3 or 4 of the machine. A collar is indicated at 54. Above the collar 54 there extends a data transfer pin 55 which at its upper (rearward) end is in contact with the measured signal pick-up device 29 of the measuring instrument 21. A compression spring is indicated at 56, and a transmission stem is indicated at 57. The compression spring 56 permits a relative movement of the data pick-up component 29 in the direction of the arrow A.

On the data transfer pin 55 there is provided an identifying data carrier 58 which in the present case is provided with optical or magnetic annular identifications 59. In the region of its head end, the measuring instrument 21 is provided with a measuring chamber 61 which at its forward end contains an identifying data sensing feeler 60. Latch-type pins, which are provided at the forward end of the measuring head of the measuring instrument 21, are indicated at 62 and 63. In a manner which is not illustrated, these latching pins are mounted resiliently.

Figure 7:
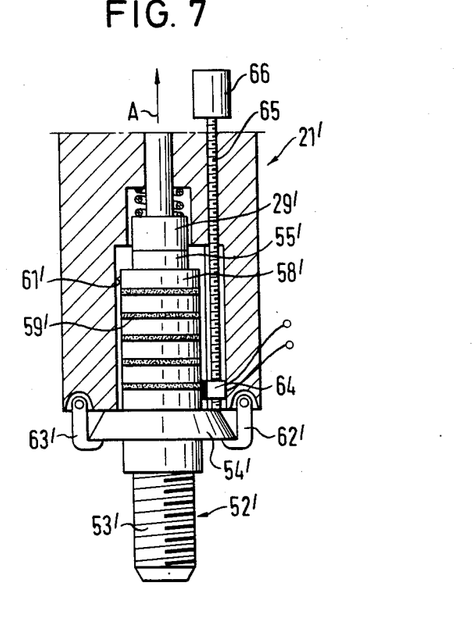
FIG. 7 is a partial cross-sectional view through a data transfer component with set-on measuring head and with a movable feeler.

In the embodiment shown in FIG. 7, the components which correspond to the components shown in FIG. 6 are provided with the corresponding reference numerals. For differentiation however, the reference numerals in FIG. 7 are provided with indices.

Reference numeral 64 indicates an identifying data sensing unit which is movable in the direction of arrow A and in the direction opposite thereto. The sensing unit 64 is guided on a spindle 65 which is displaced rotationally by an electric motor 66. Upon rotation of the spindle 65 the identifying data sensing unit is moved in the direction of arrow A.

Figure 8:
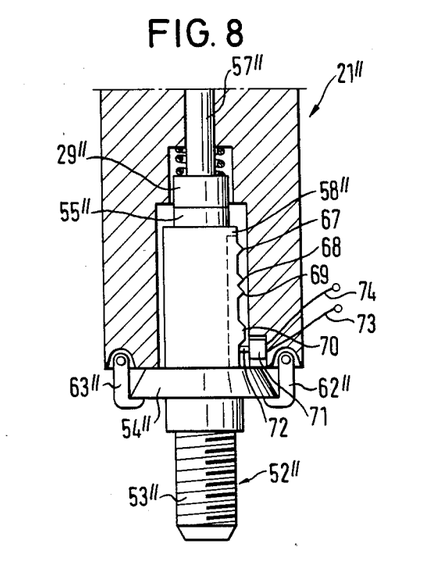
FIG. 8 is a partial sectional view through a data transfer component with set-on measuring head for mechanical sensing of identifying data.

In FIG. 8 the components corresponding to the components shown in FIG. 6 are provided with the same reference numerals. In order to distinguish them, they are however provided in FIG. 8 with indices. In contrast to the embodiments shown in FIGS. 6 and 7, the identifying data carrier 58" here carries mechanical coding in the form of lugs or detents 67, 68, 69 and 70. A microswitch 71 which is provided with a sensing pin 72 serves here as the identifying data sensing element. When the measuring head of the measuring instrument 21" is placed or set on the data transfer component 52", the mechanical identifications or coding detents are sensed automatically. The microswitch 71 automatically generates appropriate identification pulses through its connecting leads 73 and 74.

Figure 9:
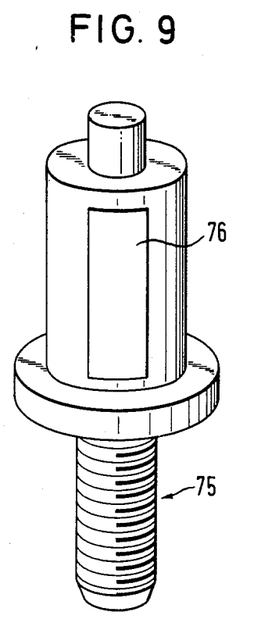
FIGS. 9 and 9a show a data transfer component with a magnetic layer carrier serving as the identifying data carrier.
Figure 9A:
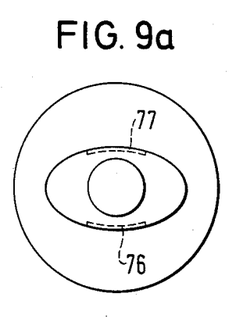

In the embodiment shown in FIGS. 9 and 9a there is illustrated a data transfer component 75 which is formed in a manner similar to that shown in the preceding Figures. In contrast however the identifying data carrier here comprises a magnetic layer or film or the like 76 and 77. The identifying data carrier is formed as an ellipse in shape overall. The same shape applies to the measuring chamber of the measuring head of the measuring instrument 21. In this way one ensures that in sensing the identifying data the identifying data sensing unit corresponds with the identifying data carrier, i.e. they are correctly aligned.

Figure 10:
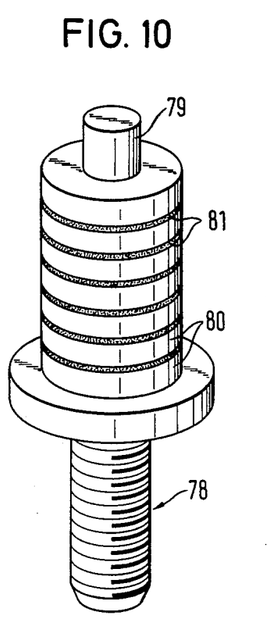
FIGS. 10 and 10a show a data transfer component with magnetic rings and spacing rings arranged on a pin for coding.
Figure 10A:
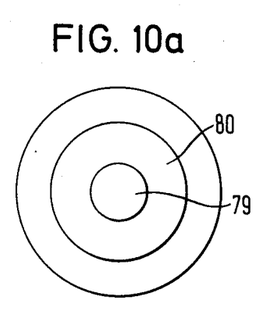

In the embodiment shown in FIGS. 10 and 10a, there is illustrated a data transfer component 78 which has, on the test data transfer side, a test data transfer pin 79 on which releasably exchangeable spacer rings 80 and magnetic or optical identification rings 81 are arranged. This embodiment has the advantage that the machine-side identifications can be combined in a simple manner and individually.

Figure 11:
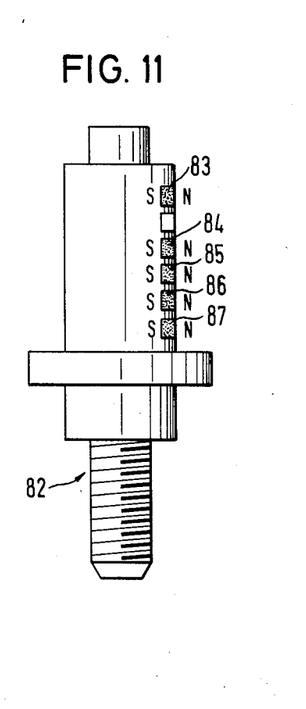
FIG. 11 shows a data transfer component having permanent magnets set into it; and, FIG. 12 shows a data transfer component with optical bar coding.

In the embodiment shown in FIG. 11, there is a data transfer component 82 which has permanent magnets 83, 84, 85, 86 and 87 inserted therein. By changing over the polarity when inserting the permanent magnets one can distinguish between a north-south direction and a south-north direction. Such permanent magnet identifications and codings can be evaluated in a simple manner by the use of induction sensing elements.

Figure 12:
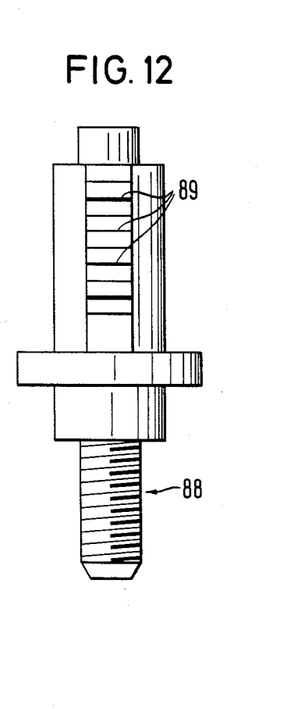

In the embodiment shown in FIG. 12, there is a data transfer component 88 which is provided with optical bar codings 89 which, in a simple manner, can be read by an optical sensor in the measuring chamber of the measuring head of the measuring instrument 21.

With the embodiments shown in FIGS. 6 and 7 there are basically two possibilities for extracting the identifying data.

The first possibility for the extraction of the identifying data, which also applies to the embodiments shown in FIGS. 8, 9, 10, 11 and 12, is that, upon placing or setting the measuring head of the measuring instrument on the data transfer component, the forward-side identifying data sensor is moved automatically along the codings and identifications and thereby generates electrical signals in the form of pulses which are transmitted onwards by way of the signal lead 27 of FIG. 4 for evaluation. When the measuring head end is set positioned on the data transfer component, then the grippers engage around the corresponding collar on the data transfer component. By this means the measuring instrument is guaranteed to have its measuring head in contact with the data transfer component. In the same way, the test data receiving element 29 is coupled snugly to the data transfer pin 55. Consequently, as a follow-up to the extraction of the identifying data, the test data can be transmitted in a simple manner for evaluation.

With the second possibility, according to FIG. 7, the measuring head is set in position on the data transfer component and is secured by the grippers 63' and 62' against the collar 54'. Next, by reason of a control command, the sensing of the identifying data takes place by actuation of the motor 66. Thereby in consequence of the rotation of the spindle 65, the identifying data sensing element 64 is moved in the direction of arrow A, with the result that the identifying data codings 59' are sensed. The changeover from identifying data extraction operation to test data sensing and evaluation operation is achieved by the use of the switch 36 shown in FIG. 4.

In the embodiment shown in FIG. 6 the operating switch 36 has only one switching on function, for the transmission of the test data to the evaluation circuit.

The digital identifying data and test data are fed to the input/output circuit 42. From there the data is transferred to the associated writing and reading memory 46 and then, under the control of the appropriate running program for the reading operation, is processed by the microprocessor 54 and is outputted. This means that the data specific to the measuring point and ascertained from the appropriate coding and stored is outputted into the writing and reading memory 46. Next, the measuring instrument is placed at the associated measuring point and after the sensing of the identifying data the switch 36 is actuated. Upon closure of the operating switch 36 the measurement value sensing program is recalled from the fixed value memory 45, this program taking the place of the identifying data reading program. By virtue of this, the acoustic signal receiving unit 31 is activated. The measured test values are fed by way of the input/output circuit 42 to the microprocessor 44 and to the associated writing and reading memory. There then follows a comparison operation between real values and desired values. The result of this is indicated on the display panel in a manner which is not shown. On the display panel, as has already been mentioned above, there is provided a display, in particular, of which machine component or part is involved and of which measuring point is being interrogated.

The individual data which is gathered is transferred to the central data processing installation at the end of a measuring routine.

I claim:

1. Method of determining and evaluating data representative of the condition of a machine provided with measuring points, wherein a data probe is placed at the measuring points, test data are sensed and the sensed test data are transferred to an evaluation circuit incorporating memory means and are there processed, wherein identifying data representative of the measuring points and provided at each respective measuring point are sensed by said data probe, wherein the sensed identifying data are transmitted to the memory means of the evaluation circuit for adaptation of the evaluation circuit to the particular measuring points of the machine, wherein the data probe is comprised of a test data probe portion and an identifying data sensing probe portion mounted in a common housing, wherein the sensing of the identifying data and the sensing of the test data are initiated by only a single placement movement of the data probe, and are performed during or after said only single placement movement of the data probe at the measuring points of the respective machine.

2. Method according to claim 1, in which optical or capacitive or magnetic or inductive or mechanical identifications are sensed by the identifying data sensing probe position.

3. Method according to claim 1, in which the processing of the test data and of the identifying data is effected after the measuring steps in a portable or stationary measuring instrument.

4. Method according to claim 3, in which a further processing and retrieval of the test data and identifying data is effected in a central processing means, particularly in a central data processing installation.

5. Measuring instrument for determining and evaluating data indicative of the condition of a machine provided with a plurality of measuring points, the instrument comprising a data probe having a test data probe portion which includes a test data receiver and an evaluation circuit with memory means for detecting and evaluating test data received from the respective measuring points, the data probe also having an identifying data sensing probe portion comprising a sensor unit for sensing identifying data representative of the respective measuring points, wherein the memory means comprises storage space for data specific to the measuring points and which is activated by the corresponding identifying data from the measuring points, wherein the test data probe portion and the identifying data sensing probe portion are provided in a common housing of said data probe with a measuring head, in which housing there is provided a measuring chamber for a machine-side data transfer means, said chamber having an opening towards a forward end of the measured head for receiving said data transfer means, said data transfer means also being a carrier for the identifying data specific to a measuring point, and wherein the identifying data sensing probe portion is arranged at a side of the measuring chamber viewed in a direction of placement of the data probe and is movable along the identifying data of the identifying data carrier so that both the test data and the identifying data are read through said opening of the measuring chamber.

6. Measuring instrument according to claim 5, in which a test data receiver is arranged at the bottom of the measuring chamber, and in which the identifying data sensing probe portion is mounted fixedly at the side of the measuring head end of the measuring chamber so that it is moved automatically along the identifying data upon the placement of the measuring head on the data transfer means.

7. Measuring instrument according to claim 6, in which the test data receiver is resiliently mounted in the measuring chamber for movement in the direction of placement of the measuring head.

8. Measuring instrument according to claim 5, in which the identifying data sensing probe portion is mounted movably in the measuring chamber and is movable along the identifying data by drive means with the measuring head placed on the test data transfer means.

9. Measuring instrument according to claim 5,
in which the forward head end of the measuring head is provided with fastening means which secure the placed measuring head on the data transfer means.

10. Measuring instrument according to claim 9, in which the fastening means comprise resilient latch-type lever means which engage automatically about a retaining means on the data transfer means when the measuring head is set in place.

11. Measuring instrument according to claim 5,
in which the sensing data sensing probe is formed as a digitally operating optical probe with a radiation source, a radiation-sensitive receiver and a digital signal processing circuit for the reading of optical identifying data.

12. Measuring instrument according to claim 5,
in which the sensing data sensing probe is formed as a capacitive probe for the reading of capacitive identifying data.

13. Measuring instrument according to claim 5,
in which the sensing data sensing probe is formed as a magnetic reading head for the reading of magnetic identifying data.

14. Measuring instrument according to claim 5,
in which the sensing data sensing probe is formed as an induction reading head for the reading of inductive identifying data.

15. Measuring instrument according to claim 5,
in which the sensing data sensing probe is formed as a sensor having pulse generator means for the sensing of mechanical or electrical codings.

16. Measuring instrument according to claim 5,
in which an operating switch is provided by means of which, upon setting the measuring head in place, the switch is actuated to render both the test data probe portion and also the identifying data sensing probe position operative.

17. Measuring instrument according to claim 16, in which the measuring head is fastenable to the data transfer means, and wherein a changeover from an identifying data sensing step to a test data transmission step is effected by means of a pressure switch automatically upon fastening of the measuring head to the data transfer means.

18. Measuring instrument according to claim 16, in which the data probe is placed on the data transfer means for identifying data and test data transmission, and wherein a changeover from an identifying data sensing step to a test data transmission step is effected by a sequence control circuit which is activated upon placing of the data probe on the data transfer means.

19. Measuring instrument according to claim 16, in which the operating switch is formed as a pressure switch or telescopic switch and is actuatable by telescopic-type displacement of to housing parts of the data probe.

20. Measuring instrument according to claim 5, in which the data probe comprises an acoustic signal receiver, particularly a shock signal receiver, as wheel as an analog to digital converter.

21. Measuring instrument according to claim 5, which comprises a microcomputer with memory means and is formed as a portable measuring instrument which is provided with connector means through which the identifying data and test data can be transferred to a central data processing means.

* * * * *